US011425065B1

(12) United States Patent
Prevatt, III et al.

(10) Patent No.: US 11,425,065 B1
(45) Date of Patent: Aug. 23, 2022

(54) METHOD OF RECONCILING ORPHAN A2P MESSAGING DELIVERY RECEIPTS

(71) Applicant: Syniverse Technologies, LLC, Tampa, FL (US)

(72) Inventors: Myron C. Prevatt, III, Tampa, FL (US); Madhusudhan Mysore, Bangalore (IN); Harish Kumar, Bangalore (IN); Chethan Ramaiah, Taluk Tumakuru (IN); Kiran Seetharamaiah, Bangalore (IN); Nithesh Sivasankaran, Bangalore (IN); Manjunath Lakshminarayan, Bangalore (IN); Trung K. Nguyen, Lakewood Ranch, FL (US); Abraham Elias, Lakewood Ranch, FL (US); Jamie Avins, Bradenton, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 17/521,342

(22) Filed: Nov. 8, 2021

Related U.S. Application Data

(60) Provisional application No. 63/110,648, filed on Nov. 6, 2020.

(51) Int. Cl.
| | |
|---|---|
| *G06F 15/16* | (2006.01) |
| *H04L 51/046* | (2022.01) |
| *G06F 16/906* | (2019.01) |
| *H04W 4/14* | (2009.01) |
| *H04L 51/23* | (2022.01) |

(52) U.S. Cl.
CPC .......... *H04L 51/046* (2013.01); *G06F 16/906* (2019.01); *H04L 51/30* (2013.01); *H04W 4/14* (2013.01)

(58) Field of Classification Search
CPC ..... H04L 51/046; H04L 51/30; G06F 16/906; H04W 4/14
USPC ................ 709/206, 204, 207, 217, 223, 238
See application file for complete search history.

(56) References Cited

U.S. PATENT DOCUMENTS

| | | | | |
|---|---|---|---|---|
| 2001/0032263 | A1* | 10/2001 | Gopal | .................... G06Q 30/06 709/227 |
| 2006/0209830 | A1* | 9/2006 | Oguchi | .................. H04L 45/00 370/392 |

* cited by examiner

*Primary Examiner* — Kaylee J Huang
(74) *Attorney, Agent, or Firm* — Smith & Hopen, P.A.; Andriy Lytvyn

(57) ABSTRACT

A method of delivering an orphan delivery receipt for a mobile-terminated message to a messaging platform from which the mobile-terminated message originated. A network of data exchange connectors is deployed, wherein each data exchange connector is associated with a messaging platform. When one of the messaging platforms receives a delivery receipt it cannot reconcile, the delivery receipt is replicated to all data exchange connectors. The data exchange connector associated with the messaging platform from which the mobile-terminated message originated identifies and consumes the delivery receipt based on predefined filtering criteria. The data exchange connector publishes the delivery receipt to the originator messaging platform. The originator messaging platform correlates the delivery receipt with the mobile-terminated message and posts the delivery receipt to a corresponding enterprise customer.

18 Claims, 3 Drawing Sheets

METHOD OF RECONCILING ORPHAN A2P MESSAGING DELIVERY RECEIPTS

PRIORITY CLAIM

This non-provisional patent application claims priority to a U.S. Provisional Application No. 63/110,648 filed on Nov. 6, 2020.

BACKGROUND OF THE INVENTION

1. Field of the Invention

This invention relates generally to the field of telecommunication networks. More specifically, the invention pertains to a method of reconciling orphan Application-to-Person (A2P) messaging delivery receipts.

2. Brief Description of the Related Art

Application-to-Person (A2P) messaging systems commonly have multiple messaging platforms with redundant capabilities for message delivery. Each A2P messaging system normally has one account with one or more suppliers—i.e., Operator/Aggregator for Short Message Service (SMS) delivery. For example, SYNIVERSE A2P messaging system uses IMN and BARRACUDA messaging platforms, both of which need to deliver A2P messages through the same supplier. The A2P messaging system account with a supplier may have a ceiling on throughput and number of connections (binds). For every mobile-terminated message (MT) delivered via a particular supplier, one or more delivery receipts (DR) are generated, which subsequently must be relayed back to the content originator or enterprise customer that requested transmission of the A2P MT message.

From a supplier perspective, it may be difficult to distinguish between various A2P platforms because these A2P messaging platforms are connected on the same account. Because a supplier may not be able to distinguish between multiple A2P messaging platforms, the supplier may send a delivery receipt to an incorrect bind. For example, a delivery receipt for a MT-message sent from BARRACUDA messaging platform may arrive at IMN messaging platform, and vice-versa. In the A2P messaging industry, delivery receipts sent to an incorrect messaging platform are termed "orphan delivery receipts." Messaging platforms in receipt of orphan delivery receipts cannot correctly process them because orphan delivery receipts do not correlate to an originating MT-message sent via their platform.

Thus, what is needed is an effective, scalable, low-latency method for reconciling orphan delivery receipts for successfully delivered A2P MT-messages.

SUMMARY OF THE INVENTION

In an embodiment, the invention pertains to a method of reconciling an orphan delivery receipt for an Application-to-Person (A2P) mobile-terminated message. A network of data exchange connectors is provided, wherein each data exchange connector is associated with a messaging platform. Multiple messaging platforms may be associated with a single messaging supplier—i.e., Short Message Service (SMS) operator or aggregator. Upon successful delivery of a mobile-terminated message, the supplier sends a corresponding delivery receipt to one of the messaging platforms associated with the supplier account.

Upon receiving the delivery receipt from the messaging supplier, the messaging platform in possession of the delivery receipt attempts to correlate the delivery receipt with a mobile-terminated message to which that delivery receipt pertains. If the messaging platform fails to correlate the delivery receipt with the mobile-terminated message, the messaging platform publishes this delivery receipt to a data exchange connector. The delivery receipt may be published to a predefined topic in a KAFKA cluster. The delivery receipt is then replicated to all data exchange connectors within the network.

The data exchange connector associated with the messaging platform from which the mobile-terminated message originated consumes the delivery receipt based on a set of predefined filtering criteria. Then, the data exchange connector publishes the delivery receipt to the corresponding messaging platform associated with the data exchange connector. The messaging platform correlates the delivery receipt with the corresponding mobile-terminated message and posts the delivery receipt to an enterprise customer that requested the messaging platform to send the mobile-terminated message.

In an embodiment of the invention, the data exchange connectors can be implemented as Java Virtual Machine (JVM) applications. The data exchange connectors may be built on top of a reactive streams or a container-native technology, such as AKKA or ALPAKKA KAFKA.

In an embodiment, each data exchange connector is communicatively coupled to a global configuration store, such that setting adjustments entered via the global configuration store automatically propagate to all data exchange connectors within the network in real-time.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

Figure 1:
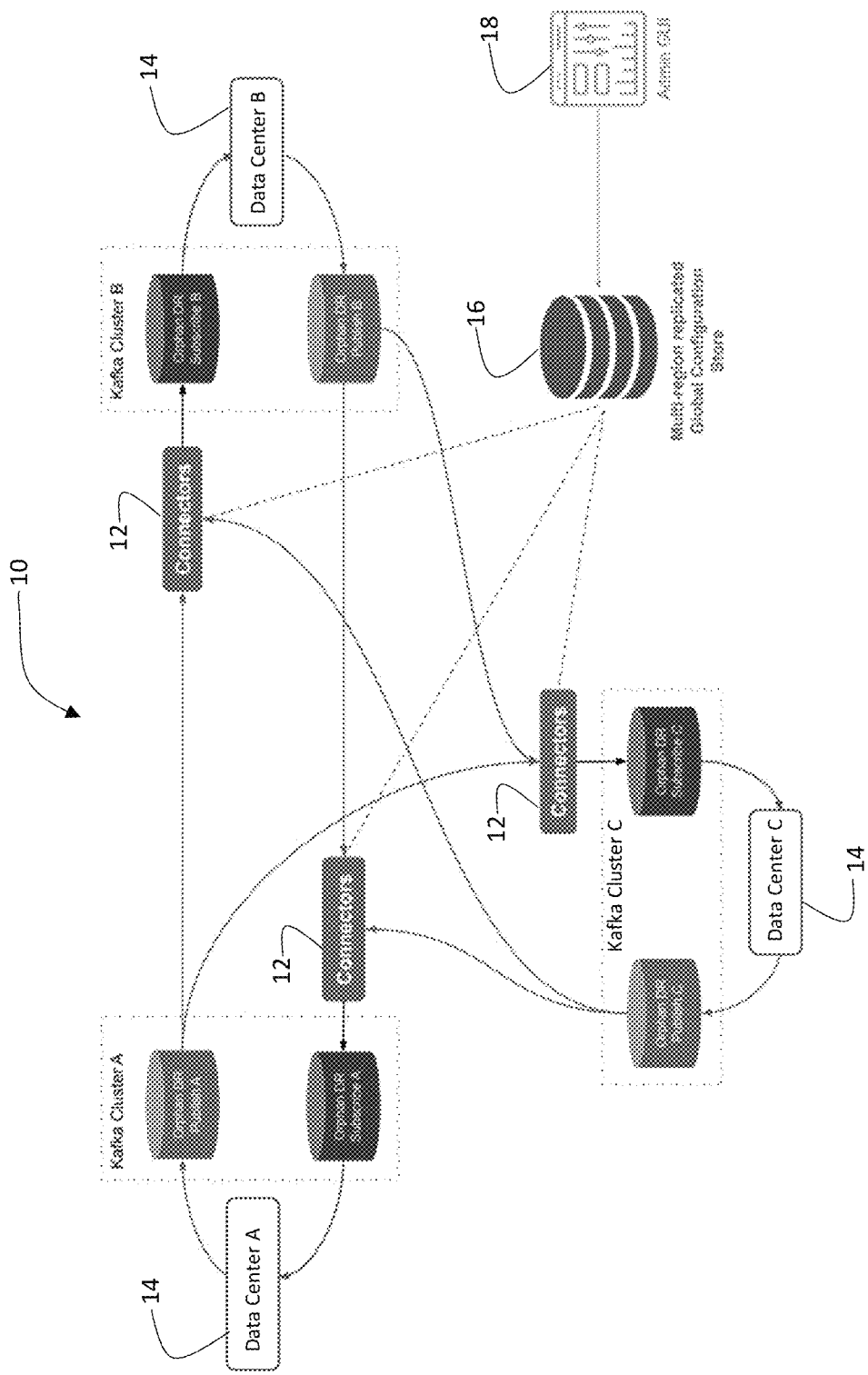
FIG. 1 is a diagram schematically depicting an exemplary network architecture of an embodiment of the invention.

Embodiments of the present invention pertain to a method of reconciling orphan A2P messaging delivery receipts. FIG. 1 depicts an exemplary architecture of an embodiment of an invention, referred to herein as Orphan Delivery Receipt Exchange (ODRE) Network 10. FIG. 1 depicts a plurality of data exchange connectors 12 deployed at multiple data centers 14, wherein each data center 14 is associated with a particular messaging platform. Data exchange connectors 12 may be deployed in multiple data centers 14, which may be located within the same geographic region or across multiple geographic regions, for the same messaging platform and/or multiple platforms.

Data exchange connectors 12 are configured to import/export data streams. In an embodiment, data exchange connectors 12 are configured to consume (read) or publish (write) streams of events from and to external systems and applications so that these external system and application can integrate with a data streaming technology, such as APACHE KAFKA. More detailed explanation of data exchange connectors 12 and other terminology used herein is provided in APACHE KAFKA documentation, available at the following URL: https://kafka.apache.org/documentation, which is incorporated herein by reference.

Data exchange connectors 12 can be deployed across various geographic regions and messaging platforms. In an embodiment, each data exchange connector 12 can be a self-contained Java Virtual Machine (JVM) application and may be built on top of reactive streams and container-native technologies, such as AKKA STREAMS and ALPAKKA KAFKA. Data exchange connectors 12 can be deployed as horizontally scalable containers in each data center 14 and/or geographic region where an orphan delivery receipt exchange is needed.

FIG. 1 further depicts a Global Configuration Store 16. Data exchange connectors 12 are configured to maintain live connections to Global Configuration Store 16. Global Configuration Store 16 is a highly available key-value data store. Global Configuration Store 16 can be replicated in multiple regions. Global Configuration Store 16 can be configured to contain configuration values for all data exchange connectors 12 across the entire fleet. In an embodiment, Global Configuration Store 16 can be managed via an Administrator Graphic User Interface (GUI) 18, which may be hosted using a cloud service, such as AMAZON WEB SERVICES (AWS) DynamoDB, or on an on-premise solution, for example FoundationDB. Global Configuration Store 16 provides consistent reads and a low latency change feed.

Data exchange connectors 12 maintain live connections to the Global Configuration Store 16 and monitor Global Configuration Store 16 for changes. Each data exchange connector 12 is configured to detect configuration changes at Global Configuration Store 16. Thus, when an administrator makes a configuration change via Administrator GUI 18, configuration changes automatically propagate to the entire fleet of data exchange connectors 12, in real-time. When needed, each data exchange connector 12 is configured to self-reload, thereby minimizing disruption to the service. In this manner, ORDE Network 10 provides a highly scalable publish/subscribe mesh on top of KAFKA, which enables exchanging orphan delivery receipts with the highest possible aggregated throughput (hundreds of thousands of TPS), while maintaining low latency.

Figure 2:
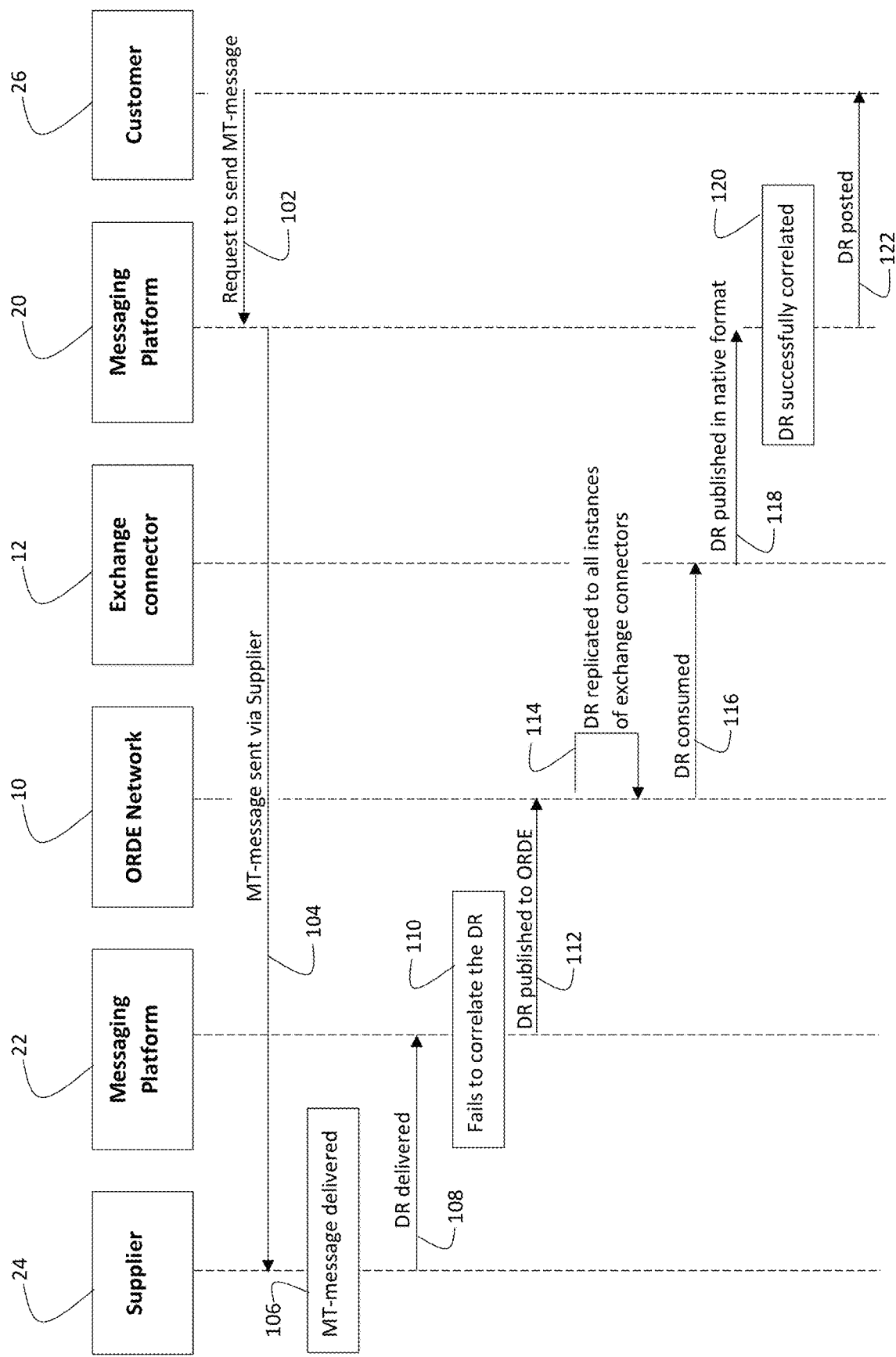
FIG. 2 is a signaling diagram depicting an exemplary messaging flow according to an embodiment of the invention.

FIG. 2 depicts an exemplary signalling flow diagram for reconciling orphan delivery receipts according to an embodiment of the invention. In FIG. 2, Messaging Platform 20 and Messaging Platform 22 are two distinct messaging platforms connected to a common messaging Supplier 24. Because Messaging Platform 20 and Messaging Platform 22 are connected to a common messaging Supplier 24, they need to share connections (binds) associated with Supplier 24. From a perspective of Supplier 24, there is no distinction between Messaging Platforms 20 and 22 because they are connected on the same A2P messaging system account. This means that, upon successful delivery of an A2P MT-message, Supplier 24 may send the delivery receipt to any of the binds, rather than to the bind associated with the specific messaging platform from which the A2P MT-message originated. Thus, a delivery receipt for a MT-message sent from Messaging Platform 20 may arrive at Messaging Platform 22 and vice-versa.

A delivery receipts that arrives to a messaging platform that did not originate the MT-message is termed an "orphan delivery receipt" because such delivery receipt cannot be reconciled by the receiving messaging platform. For example, Messaging Platform 20 cannot reconcile a delivery receipt for a MT-message that originated from Messaging Platform 22, and Messaging Platform 22 cannot reconcile a delivery receipt for an MT-message that originated from Messaging Platform 20. Thus, when Supplier 24 sends a delivery receipt to a wrong messaging platform, the messaging platform in possession of the delivery receipt cannot reconcile it with the MT-message to which it pertains. This problem is resolved by the present invention, as explained in more detail below.

FIG. 2 depicts that, in step 102, Enterprise Customer 26 requests Messaging Platform 20 to send an A2P MT-message to a target recipient. In step 104, Messaging Platform 20 transmits the MT-message to messaging Supplier 24. In step 106, Supplier 24 delivers the MT-message to the target recipient. Upon successful delivery of the MT-message message to its target recipient, Supplier 24 provides a delivery receipt to Messaging Platform 22 in step 108.

In this example, the MT-message originated from Messaging Platform 20, and, therefore, the delivery receipt can only be processed by Messaging Platform 20. Thus, FIG. 2 depicts that, in step 110, Messaging Platform 22 fails to correlate the delivery receipt with the corresponding MT-message because the MT-message associated with the delivery receipt did not originate from Messaging Platform 22. At this point, the delivery receipt is considered an "orphan." Every massaging platform upon receipt of a delivery receipt attempts to find a record of a corresponding MT-message. If the correlation fails, such delivery receipt is published to a specific topic in a Kafka cluster. ODRE Network 10 picks up such orphan delivery receipts and delivers them to Kafka topics where data exchange connectors 12 from other messaging platform are listening.

In step 112, Messaging Platform 22 uses its co-located exchange network connector 12 to publish the orphan delivery receipt to ODRE Network 10. Next, in step 114, ORDE Network 10 replicates the orphan delivery receipt to all data exchange connectors 12. In step 116, data exchange connector 12 associated with Messaging Platform 20 identifies the orphan delivery receipt based on predefined filtering criteria and consumes that orphan delivery receipt. In step 118, data exchange connector 12 associated with Messaging Platform 20 publishes the orphan delivery receipt to Messaging Platform 20 in the native format (file-queue or topic).

In step 120, Messaging Platform 20—which is the messaging platform that originated the MT-message associated with the orphan delivery receipt—successfully correlates the orphan delivery receipt with the corresponding record of an outgoing MT-message. At this point, the delivery receipt is no longer an orphan. After reconciling the delivery receipt, Messaging Platform 20 posts the delivery receipt to Enterprise Customer 26 in step 122, thereby enabling the Messaging Platform 20 to collect the fee associated with successfully sending the MT-message and providing a confirmation to Enterprise Customer 26 that the MT-message was successfully delivered to its target recipient.

Figure 3:
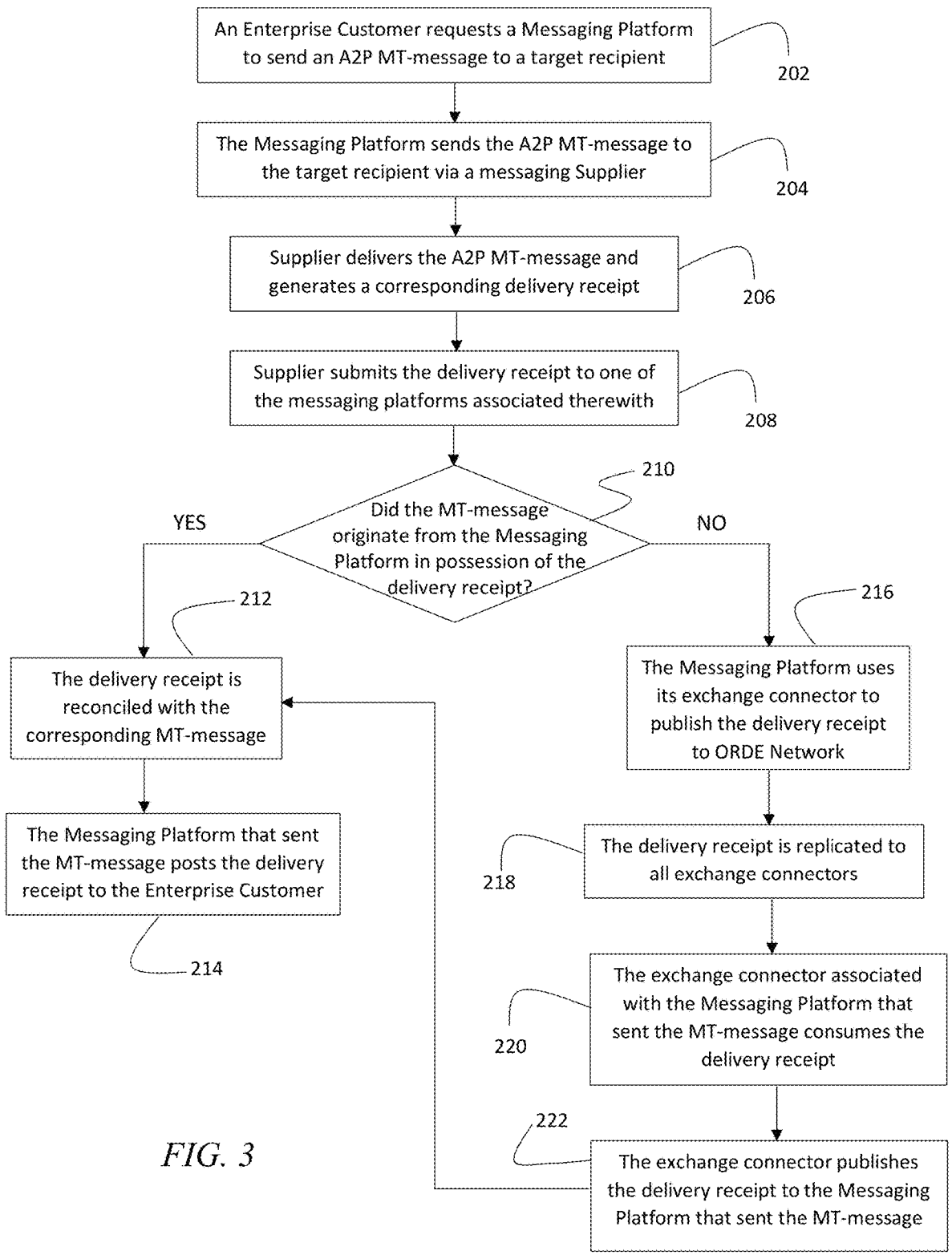
FIG. 3 is a flowchart depicting a sequence of steps according to which an embodiment of the invention operates.

FIG. 3 depicts a flowchart illustrating an embodiment of the invention. In step 202, Enterprise Customer 26 requests Messaging Platform 20 to send an A2P MT-message to the target recipient. In step 204, Messaging Platform 20 sends the A2P MT-message to the target recipient via a messaging Supplier 24. In step 206, Supplier 24 delivers the MT-message to the target recipient and generates a delivery receipt. In this example, multiple messaging platforms share binds and use the same messaging Supplier 24 for sending A2P MT-messages. Thus, as explained above, Supplier 24 may be unable to correctly determine the messaging platform from which the MT-message originated.

In step 208, Supplier 24 submits the delivery receipt for the delivered MT-message to one of the messaging platforms associated with Supplier 24. If Supplier 24 submits the delivery receipt to Messaging Platform 20, then in step 210, Messaging Platform 20 will confirm that it was the originator of the MT-message and will proceed to step 212, in which Messaging Platform 20 will reconcile the delivery receipt with the corresponding MT-message. Finally, in step 214, Messaging Platform 20 will post the delivery receipt to Enterprise Customer 26.

On the other hand, if it is determined in step 210 that Supplier 24 submitted the delivery receipt to Messaging Platform 22, which did not originate the MT-message, the method will proceed to step 216. In step 216, Messaging Platform 22 will use its corresponding data exchange connector 12 to publish the delivery receipt to ORDE Network 10. In step 218, the delivery receipt will be replicated to all instances of data exchange connectors 12. Then in step 220, data exchange connector 12 associated with Messaging Platform 20 will consume the delivery receipt based on a set if predefined filtering criteria. In step 222, data exchange connector 12 will publish the delivery receipt to Messaging Platform 20 in its native format. At this point, Messaging Platform 20, from which the MT-message was sent, is now in possession of the corresponding delivery receipt confirming successful delivery of the MT-message to its target recipient. Next, the method proceeds to step 212, in which Messaging Platform 20 will reconcile the delivery receipt with the MT-message. Finally, in step 214, Messaging Platform 20 will post the delivery receipt to Enterprise Customer 26.

Hardware and Software Infrastructure Examples

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of reconciling a delivery receipt for a mobile-terminated message comprising the steps of:
providing a first data exchange connector, wherein the first data exchange connector is associated with a first messaging platform;
providing a second data exchange connector, wherein the second data exchange connector is associated with a second messaging platform, wherein the first messaging platform and the second messaging platform are connected to a common messaging supplier and share connections associated with the common messaging supplier;
receiving, from the common messaging supplier by the second messaging platform, the delivery receipt for the mobile-terminated message originated from the first messaging platform, wherein the second messaging platform fails to correlate the delivery receipt with a record of the mobile-terminated message associated with the delivery receipt;
publishing, by the second messaging platform, the delivery receipt to the second messaging exchange network connector associated with the second messaging platform;
consuming, by the first data exchange connector, the delivery receipt;
publishing, by the first data exchange connector, the delivery receipt to the first messaging platform;
correlating, by the first messaging platform, the delivery receipt with the record of the mobile-terminated message originating from the first messaging platform; and
posting the delivery receipt to an entity that requested transmission of the mobile-terminated message.

2. The method of claim 1, wherein the mobile-terminated message is an Application-to-Person (A2P) message.

3. The method of claim 1, wherein the first data exchange connector and the second data exchange connectors belong to a network of data exchange connectors.

4. The method of claim 3, wherein the delivery receipt is replicated to the network of data exchange connectors.

5. The method of claim 4, wherein, upon the delivery receipt being replicated to the network of data exchange connectors, the first data exchange connector is configured to consume the delivery receipt based on a set of predefined filtering criteria.

6. The method of claim 1, wherein responsive to the second messaging platform failing to correlate the delivery receipt with the mobile-terminated message, the delivery receipt is published to a predefined topic in a cluster of servers.

7. The method of claim 1, wherein the first data exchange connector is a virtual machine application.

8. The method of claim 3, wherein the network of data exchange connectors are based on a reactive streams or a container-native technology.

9. The method of claim 1, wherein the first messaging platform and the second messaging platform are configured to send mobile-terminated messages using the common messaging supplier.

10. The method of claim 1, wherein the common messaging supplier is a Short Message Service (SMS) operator or aggregator.

11. The method of claim 1, wherein the first data exchange connector and the second data exchange connector are communicatively coupled to a global configuration store, and wherein setting adjustments entered via the global configuration store propagate to the first data exchange connector and the second data exchange connector.

12. A method of reconciling a delivery receipt for a mobile-terminated message comprising the steps of:
- providing a network of a plurality of data exchange connectors, wherein each data exchange connector is associated with one or more messaging platforms, and wherein the one or more messaging platforms are connected to a common messaging supplier and share connections to the common messaging supplier;
- receiving, from the common messaging supplier by a first data exchange connector of the plurality of data exchange connectors, the delivery receipt from a first messaging platform, wherein the first messaging platform failed to correlate the delivery receipt to the mobile-terminated message;
- replicating the delivery receipt to the plurality of data exchange connectors;
- consuming, by a second data exchange connector of the plurality of data exchange connectors, the delivery receipt based on one or more predefined filtering criteria, wherein the second data exchange connector is associated with a second messaging platform from which the mobile-terminated message originated; and
- publishing, by the second data exchange connector, the delivery receipt to the second messaging platform, wherein the second messaging platform correlates the delivery receipt with the mobile-terminated message and posts the delivery receipt to an entity that requested transmission of the mobile-terminated message.

13. The method of claim 12, wherein the mobile-terminated message is an Application-to-Person (A2P) message.

14. The method of claim 12, wherein responsive to the first messaging platform failing to correlate the delivery receipt with the mobile-terminated message, the delivery receipt is published to a predefined topic in a cluster of servers.

15. The method of claim 12, wherein the first data exchange connector is a virtual machine application.

16. The method of claim 12, wherein the first data exchange connector is based on a reactive streams or a container-native technology.

17. The method of claim 12, wherein the first messaging platform and the second messaging platforms are configured to send mobile-terminated messages using the common messaging supplier.

18. The method of claim 12, wherein the common messaging supplier is a Short Message Service (SMS) operator or aggregator.

* * * * *